United States Patent [19]

Li

[11] 3,997,976
[45] Dec. 21, 1976

[54] SENSITIVE TILTMETER

[75] Inventor: Yao T. Li, Lincoln, Mass.

[73] Assignee: Massachusetts Institute of Technology, Cambridge, Mass.

[22] Filed: Mar. 19, 1975

[21] Appl. No.: 559,988

Related U.S. Application Data

[63] Continuation of Ser. No. 397,340, Sept. 14, 1973, abandoned.

[52] U.S. Cl. .................................. 33/391; 33/365; 33/366
[51] Int. Cl.² ........................................ G01C 9/16
[58] Field of Search ................. 73/82; 33/365, 366, 33/346, 391, 397, 402

[56] References Cited

UNITED STATES PATENTS

| | | | |
|---|---|---|---|
| 1,667,840 | 5/1928 | Colvin | 33/402 |
| 2,577,061 | 12/1951 | Woolson et al. | 73/503 |
| 2,779,231 | 1/1957 | Drodofsky | 33/402 X |
| 3,059,343 | 10/1962 | Kermode | 33/366 X |
| 3,206,151 | 9/1965 | Lillestrand | 33/366 X |

Primary Examiner—Charles E. Phillips
Attorney, Agent, or Firm—Kenway & Jenney

[57] ABSTRACT

A normal pendulum is coupled to an inverted pendulum to provide a composite conjugate pendulum having an effective length much longer than the actual physical lengths. The motion of the pendulum is sensed by a capacitive transducer and pivot friction is minimized by a two-bar two-strap suspension system.

4 Claims, 4 Drawing Figures

SENSITIVE TILTMETER

This is a continuation of application Ser. No. 397,340 filed Sept. 14, 1973, now abandoned.

BACKGROUND AND SUMMARY OF INVENTION

A tiltmeter is a device with a sensitivity sufficiently high to detect the lateral component when there is a deviation from the direction of the earth's gravitation vector. If an accelerometer is used the accelerometer senses the lateral component of the gravitation vector when the input axis of the accelerometer is deviated from the earth horizontal. A pendulum is a particular type of accelerometer in which the pendulum arm or length provides a convenient leverage for the suspension system as well as providing the elastic constraint for centering the mass.

In the case of the pendulum, sensitivity is increased by increasing the pendulum length. For instance if it is desired to measure the tilt of $10^{-4}$ radians with a displacement sensor placed near the pendulum mass and having a full scale displacement of 1 mm., then the length of the pendulum should be $10^4$ times 1 mm., or 10 meters.

For extremely sensitive applications, for example a tiltmeter sufficient to detect the earth tide corresponding to — although very much smaller than — the ocean tide, it has been necessary to provide pendulums in the order of 50 ft. long. Unfortunately, when pendulums become much longer than one tenth meter they are too bulky for portable application and also too susceptible to the varying effects of environment such as temperature changes.

The present invention solves these problems by providing a pendulum structure whose effective length is many times the actual physical length of any part of the structure. My tiltmeter involves the use of an ordinary pendulum coupled to an inverted pendulum. The coupling is arranged so that the effective length is many times the actual length. For example, I have found it possible to couple two 10 cm. pendulums together and provide a resultant system equivalent to a 50 meter long simple pendulum.

While jeweled bearings are normally considered to be extremely low friction devices, even the friction of a jeweled bearing could prevent the achievement of the sensitivities otherwise possible with tiltmeters according to my invention. I have devised a two-bar, two-strap or ribbon suspension system which gives extremely low pivotal friction while providing rigidity in all other axes. The swing of one bar with respect to the other involves the wrapping up of two sections of the ribbon while unwrapping two similar sections so that there is zero energy change involved.

Accordingly it is an object of my invention to provide an extremely sensitive tiltmeter having a physical size very much smaller than otherwise required by conventional pendulum structures. A further object is to provide a suspension system for the pendulum which provides extremely low rotational friction but high rigidity in all other axes.

FIGURES

Figure 1:
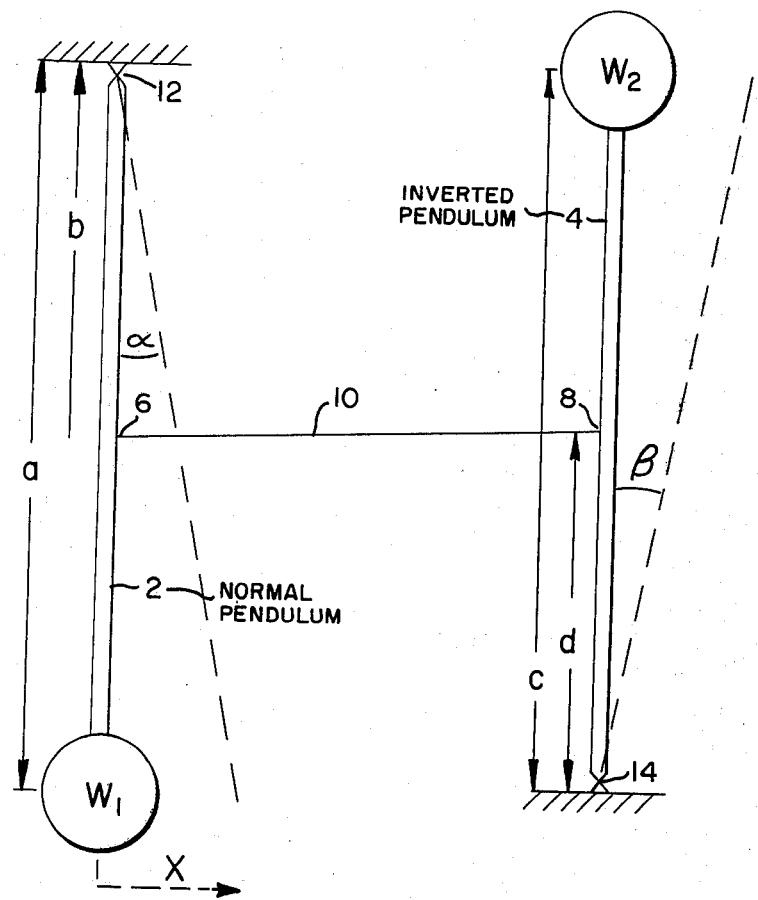
FIG. 1 is a diagrammatical sketch showing the interconnection of the two pendulums and the more significant dimensional parameters.

Referring now to FIG. 1, this schematic view of my two pendulum system permits an evaluation of the effective length of the overall structure. As set forth infra, I have found that the equation for the effective length is $$L_{eff} = \frac{a \left( W_1 \frac{a}{b} + W_2 \frac{c}{d} \right)}{W_1 \frac{a}{b} - W_2 \frac{bc}{d^2}} \tag{1}$$

To simplify that analysis we may make the mass of each pendulum the same so that $W_1 = W_2$. Then $$L_{eff} = \frac{\frac{a^2}{b} + \frac{ac}{d}}{\frac{a}{b} - \frac{bc}{d^2}} \tag{2}$$

The equation may be still further simplified by letting the lengths of the normal and inverted pendulums, $a$ and $c$ respectively, be equal or very nearly equal. Then the effective length becomes $$L_{eff} = \frac{\frac{a}{b} + \frac{a}{d}}{\frac{1}{b} - \frac{b}{d^2}} \tag{3}$$

If we let $$d = b + \sigma \tag{4}$$

and make $\sigma$ very very small or close to zero, then $$\sigma \approx 0 \tag{5}$$

then $$d^2 = b^2 + 2b + \sigma^2 \tag{6}$$

or, since $\sigma^2$ is so small it can be ignored, $$d^2 = b^2 + 2b\sigma \tag{7}$$

substituting equation (7) in equation (3) gives $$L_{eff} = a \frac{\frac{2}{b}}{\frac{1}{b} - \frac{1}{b+2\sigma}} \tag{8}$$

which simplifies to $$L_{eff} = \frac{2a}{1 - \frac{b}{b+2\sigma}} \tag{9}$$

or $$L_{eff} = \frac{2a(b+2\sigma)}{2\sigma} \tag{10}$$

and since the contribution of the $2\sigma$ term is small enough that it may be ignored, $$L_{eff} \approx \frac{ab}{\sigma} \quad (11)$$

Suppose for example that we wish the effective length to be one hundred times the actual length of one of the pendulums. Then $$\frac{b}{\sigma} = 100.$$

If the two pendulums are of equal lengths so that $a = c$ then it is well within present day fabrication skills to make the distance $b$ to the coupling point 6 on normal pendulum 2 one one hundreth larger than the distance $d$ to the coupling point 8 on inverted pendulum 4. Practical coupling members 10 will be more fully described subsequently in connection with the practical configuration of FIGS. 3 and 4.

To substitute actual numbers for the arbitrary letter designations which have been used, one might practically use 200 gram pendulum weights, pendulum lengths $a$ and $c$ of 10 cm. and coupling distances $b$ and $d$ of approximately 5 cm. with $d$ greater in length than $b$ by an amount equal to one hundreth of $b$. The effective length of the resulting pendulum would be 100 a or $100 \times 10$ cm. or 10 meters long. If all other dimensions were maintained the same but the difference in length between $b$ and $d$ reduced to two thousands of $b$ then the effective length is 500 times as long or 50 meters. The physical length however, would remain the same, that is only a structure incorporating two 10 cm. pendulums.

I have derived the equation for the effective pendulum length of my structure as follows: Referring again to FIG. 1 let pendulum 2 be displaced to the right by a distance $x$ and the angle $\alpha$ as shown to the dotted line. The pendulum 2 will then be displaced to the right by the angle $\beta$ through the link 10 coupling the two pendulums. The general equation for a pendulum is $$\frac{W}{f} = \frac{l}{x} \quad (12)$$

where $W$ equals the weight of the pendulum, $f$ equals the restoring force, $l$ equals the length of the pendulum and $x$ equals the displacement. The effective weight of my composite pendulum is computed by the following equation $$W_{eff} = W_1 \frac{a}{b} + W_2 \frac{c}{d} \quad (13)$$

where $W_1$ and $W_2$ are weights of the pendulums 2 and 4 respectively and the weight is treated as a weight at the coupling point by multiplying each weight by the ratio of the total pendulum length to the length from pivot points 12 and 14 respectively to coupling points 6 and 8 respectively. The effective force is set forth by the following equation $$f_{eff} = W_1 \frac{a}{b} \alpha - W_2 \frac{c}{d} \beta \quad (14)$$

Where the effective weight contributed by the pendulum 2 is multiplied by the sine of the angle $\alpha$ of displacement, or by the angle $\alpha$ since the angle is so small as to be very nearly equal to the sine, and the opposing contribution of the effective weight of pendulum 4 is multiplied by the sine of its angle $\beta$ of displacement or by the angle $\beta$ since the angle is so small that the sign is approximately equal to the angle. The contribution of the inverted pendulum is subtracted since the contribution is in the opposite direction for the inverted pendulum.

Since $\beta$ equals $(b/d)$ times $\alpha$, equation (14) can be converted to the following equation $$f_{eff} = W_1 \frac{a}{b} \alpha - W_2 \frac{bc}{d^2} \alpha \quad (15)$$

If we now divide the effective weight from equation (13) by the effective restoring force from equation (15) and multiply by the displacement $x$ of the effective weight which is equal to $b$ times $\alpha$ we obtain equation (16)

$$l_{eff} = \frac{\left( W_1 \frac{a}{b} + W_2 \frac{c}{d} \right) b\alpha}{W_1 \frac{a}{b} \alpha - W_2 \frac{bc}{d^2} \alpha} \quad (16)$$

which simplifies to equation (1) when the alphas are cancelled and $b$ is multiplied by $a/b$ to take into account placing the sensing transducer a distance a from pivot point 12.

$$L_{eff} = \frac{a \left( W_1 \frac{a}{b} + W_2 \frac{c}{d} \right)}{W_1 \frac{a}{b} - W_2 \frac{bc}{d^2}} \quad (1)$$

Figure 2:
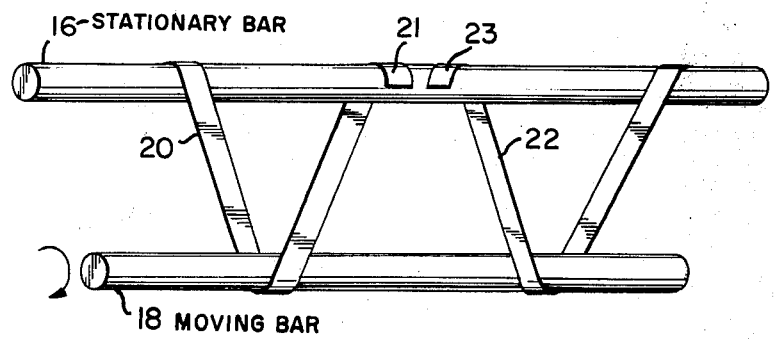
FIG. 2 is a view in perspective of my two-bar two-ribbon suspension system.

Referring now to FIG. 2 my two-bar two-ribbon suspension is shown. With the upper bar 16 stationary as shown the suspension is arranged for a normal pendulum. The moving bar 18 is supported by ribbons 20 and 22. When the moving bar 18 rotates slightly as the pendulum is displaced, the moving bar, for clockwise rotation from the left as shown, unwraps slightly from the lefthand section of ribbon 20 but wraps upon the righthand section of ribbon 20 an equivalent amount so that the elevation of the bar remains precisely the same. There is a similar wrapping and unwrapping from the ribbon 22, in this case unwrapping from the righthand section and wrapping upon the lefthand section. The ends of the ribbons 20 and 22 are firmly attached to the stationary bar 20 as shown at the two visible ends 21 and 23. I have found that this structure not only gives rotational friction very much lower than that of a jeweled pivot, but also that stiffness in other axes is high. Satisfactory materials and dimensions for a two 10 cm. pendulum structure have been found to be ⅛ inch diameter bars with 0.001 inch thick stainless steel ribbons 0.040 inch wide. The separation of the bars is approximately 1/16 inch. (The separation has been exaggerated for clarity in the drawings.) The effective pivot point is in the region of the intersection of the projection of the ribbons along an axis parallel to the bars. It is, for example, at 14' in FIG. 3 which shows an end view of a suspension system as shown in FIG. 2.

Figure 3:
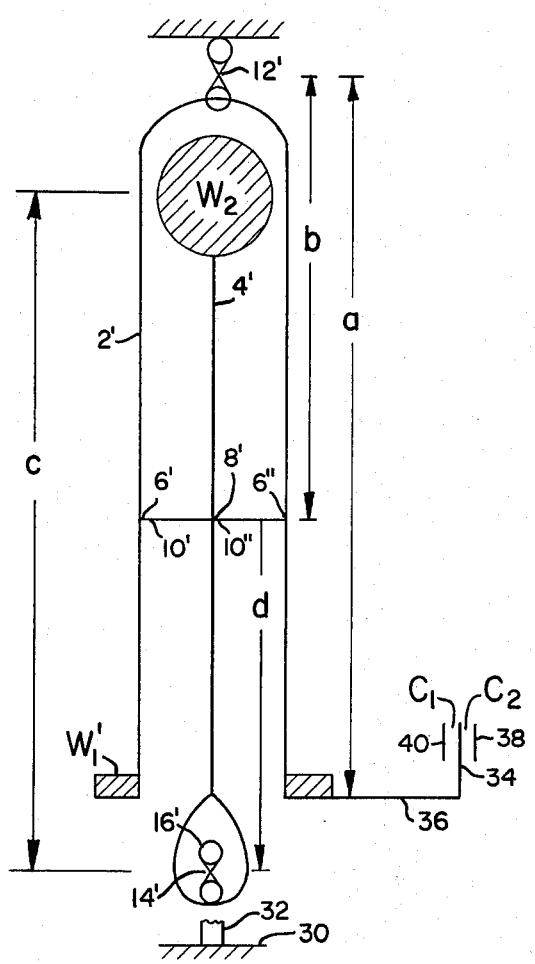
FIG. 3 is a view in cross-section elevation of my composite pendulum tiltmeter.

Referring now to FIG. 3 a view in cross-section elevation of a practical two pendulum apparatus is shown. Pendulums 2' and 4' of weights $W'_1$ and $W'_2$ are shown. The pivot point 12' for the normal pendulum 2' is a suspension system as shown in FIG. 2. The pivot point 14' for inverted pendulum 4' is also formed by a suspension as shown in FIG. 2. However, since this is an inverted pendulum the lower portion of the pendulum must be hollow or ring-shaped to allow the stationary bar 16' to be fixed to the base 30 by support 32. Support 32 has been cut away so as not to interfere with the view of the inverted pendulum and its suspension system.

Figure 4:
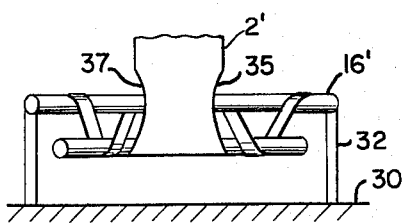
FIG. 4 is a partial view in elevation perspective of my suspension system as employed for the inverted pendulum.

An elevation view from a different angle showing this suspension system is shown in FIG. 4. To avoid introducing disturbing forces by any bending resistance of the coupling members 10' and 10" coupling points 6' and 6" of pendulum 2' with point 8' of pendulum 4' the coupling members 10' and 10" are of flexible material such as fine wire and under slight tension. The hollowed structure of pendulum 2' thus both accommodates the inverted pendulum 4' and provides for attaching the ends of the coupling members 10' and 10". A full cylinder as shown in section in FIG. 3 is not necessary, two long thin arms comparable to the intersection of the viewing plane with the cylinder shown in the elevation view of FIG. 3 could, for example, be utilized.

To sense the motion of the compound pendulum structure a plate 34 is attached to pendulum 2' by the connecting arm 36. Displacement of the pendulum 2' to the right for example, will cause plate 34 to approach plate 38 with which it forms capacitor $C_2$ and move further from plate 40 with which it forms capacitor $C_1$. Thus a differential capacitor transducer is provided. The output of the transducer may be sensed by conventional apparatus, for example, that shown in Li and Lee U.S. Pat. No. 3,518,536 wherein a differential capacitor is shown controlling a differential pulse width modulation system.

Referring now to FIG. 4, a side view of the suspension of pendulum 2 is shown. The stationary bar 16 is fixed to base 30 by supports 32. The cutout portions 35 and 37 of pendulum 2' provide access from stationary bar 16 to supports 32.

Since my composite pendulum structure may be fabricated from strong materials, and need not incorporate delicate components such as jeweled bearings, the resulting instrument can be far more portable than previous structures and also offer substantial ruggedness and durability. While I have mentioned applications requiring extreme sensitivity, there are many applications where sensitivities sufficient to sense the earth tide are not necessary. Such applications include, for example, sensing the movement of ground surrounding an excavation for a major building so that additional shoring may be employed as necessary to prevent any settling or displacement of adjoining structures or equipment. For such applications my instrument provides rugged portability and readout from a capacitive transducer using state-of-the-art techniques. It will be apparent that if desired alarms when a given tilt is exceeded, or recording devices, may easily be incorporated into the equipment utilizing the output from the capacitor transducer. While other transducers could be employed, for example inductive ones, the capacitive transducer is simple and reliable. In addition, the plates can be sufficiently rugged to provide positive protection against overtravel of the pendulum structure.

While the simplest and preferred structure is to employ pendulums of equal lengths and weights, it is possible to have different lengths or weights so long as the effective length determined in accordance with equation (1) has the desired dimension greater than the actual lengths. Construction and calibration are also simplified, and chances for inaccuracies minimized, by having the bulk of the weight concentrated at the ends of the pendulums.

Having thus described my invention I claim:

1. A composite pendulum structure comprising a normal pendulum, an inverted pendulum, the length of said pendulums being at least approximately equal, a connecting member connecting a first point on said normal pendulum with a second point on said inverted pendulum, the distance from the pivot point of said normal pendulum to the first point being approximately but not exactly the equal to the distance from the pivot point of the inverted pendulum to the second connecting point, whereby the effective pendulum length of the composite pendulum structure is very much longer than the length of either pendulum, said pendulums being pivoted upon suspension systems comprising a first cylindrical bar, a second cylindrical bar, means to hold said first bar stationary with respect to a reference member, a first ribbon partially wrapped around said stationary bar, passing around said supported bar, and returning to partially pass around said stationary bar, a second ribbon member, said second ribbon passing partially around said stationary bar, said second ribbon then passing around said second bar, said second ribbon then passing partially around said stationary bar, the ends of said first and second ribbons being affixed to said stationary bar, whereby said ribbons constrain said second bar to substantially frictional-free rotational movement but offer high resistance to any other movement of said moveable bar.

2. A composite pendulum structure comprising a normal pendulum of length a and weight $W_1$, an inverted pendulum of length c and weight $W_2$, a connecting member connecting a first point a distance b from the pivot point of said normal pendulum with a second point on said inverted pendulum a distance d from the pivot point of said inverted pendulum, whereby the effective length of the composite pendulum structure is much longer than the length of either pendulum and is represented by the following equation:

$$\text{Effective Length} = \frac{a\left(W_1 \frac{a}{b} + W_2 \frac{c}{d}\right)}{W_1 \frac{a}{b} - W_2 \frac{bc}{d^2}}$$

said pendulums being pivoted upon suspension systems comprising a first cylindrical bar, a second cylindrical bar, means to hold said first bar stationary with respect to a reference member, a first ribbon partially wrapped around said stationary bar, passing around said supported bar, and returning to partially pass around said stationary bar, a second ribbon member, said second ribbon member passing partially around said stationary bar, said second ribbon then passing partially around said stationary bar, the ends of said first and second ribbons being affixed to said stationary bar, whereby said ribbons constrain said second bar to substantially frictional-free rotational movement but offer high resistance to any other movement of said moveable bar.

3. A composite pendulum structure comprising a normal pendulum and an inverted pendulum and having an effective pendulum length very much longer than the length of either pendulum comprising a normal pendulum of length a and weight $W_1$, an inverted pendulum of length c and weight $W_2$, a connecting member connecting a first point a distance b from the pivot point of said normal pendulum with the second point on said inverted pendulum, a distance d from the pivot point of said inverted pendulum the weights, lengths and distances being chosen such that the quantity $$W_1 \frac{a}{b} - W_2 \frac{bc}{d^2}$$

is not more than 1/100 of the quantity $$a \left( W_1 \frac{a}{b} + W_2 \frac{c}{d} \right),$$

said pendulums being pivoted upon suspension systems comprising a first cylindrical bar, a second cylindrical bar, means to hold said first bar stationary with respect to a reference member, a first ribbon partially wrapped around said stationary bar, passing around said supported bar, and returning to partially pass around said stationary bar, a second ribbon member, said second ribbon passing partially around said stationary bar, said second ribbon then passing around said second bar, said second ribbon then passing partially around said stationary bar, the ends of said first and second ribbons being affixed to said stationary bar, whereby said ribbons constrain said second bar to substantially frictional-free rotational movement but offer high resistance to any other movement of said moveable bar.

4. A composite pendulum structure comprising a normal pendulum and an inverted pendulum and having an effective pendulum length very much longer than the length of either pendulum comprising a normal pendulum of length a and weight $W_1$, an inverted pendulum of length c and weight $W_2$, a connecting member connecting a first point a distance b from the pivot point of said normal pendulum with the second point on said inverted pendulum a distance d from the pivot point of said inverted pendulum, the weights, lengths and distances being chosen such that the quantity $$W_1 \frac{a}{b} - W_2 \frac{bc}{d^2}$$

is not more than 1/500 of the quantity $$a \left( W_1 \frac{a}{b} + W_2 \frac{c}{d} \right),$$

said pendulums being pivoted upon suspension systems comprising a first cylindrical bar, a second cylindrical bar, means to hold said first bar stationary with respect to a reference member, a first ribbon partially wrapped around said stationary bar, passing around said supported bar, and returning to partially pass around said stationary bar, a second ribbon member, said second ribbon passing partially around said stationary bar, said second ribbon then passing around said second bar, said second ribbon then passing partially around said stationary bar, the ends of said first and second ribbons being affixed to said stationary bar, whereby said ribbons constrain said second bar to substantially frictional-free rotational movement but offer high resistance to any other movement of said moveable bar.

* * * * *